(12) United States Patent
Arthanari et al.

(10) Patent No.: US 10,830,443 B2
(45) Date of Patent: Nov. 10, 2020

(54) MODEL-LESS COMBUSTION DYNAMICS AUTOTUNE

(71) Applicant: General Electric Company, Schenectady, NY (US)

(72) Inventors: Akilezkrishnamurthy Arthanari, Hitec (IN); Mihir Lal, Greenville, SC (US); James Harper, Greenville, SC (US); Douglas Edward Dean, Greenville, SC (US); Abhijit Prabhakar Kulkarni, Hitec (IN)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 15/391,450

(22) Filed: Dec. 27, 2016

(65) Prior Publication Data

US 2018/0149363 A1    May 31, 2018

(30) Foreign Application Priority Data

Nov. 30, 2016   (IN) .............................. 201641040986

(51) Int. Cl.
*F23R 3/34* (2006.01)
*F02C 9/34* (2006.01)
(Continued)

(52) U.S. Cl.
CPC ................. *F23R 3/34* (2013.01); *F02C 9/26* (2013.01); *F02C 9/28* (2013.01); *F02C 9/34* (2013.01); *F23R 2900/00013* (2013.01)

(58) Field of Classification Search
CPC ............. F23R 3/34; F23R 2900/00013; F05D 2260/96; F05D 2260/964; F02C 9/26; F02C 9/28; F02C 9/34
See application file for complete search history.

(56) References Cited

U.S. PATENT DOCUMENTS 8,313,324 B2 * 11/2012 Bulat ...................... F02C 7/228
                                                            431/12
8,437,941 B2    5/2013 Chandler
(Continued)

FOREIGN PATENT DOCUMENTS

CA        2 595 061 A1   1/2009
EP         2682587 A1    1/2014
(Continued)

OTHER PUBLICATIONS

Extended EP Search Report for EP 17204209.5, dated Aug. 17, 2018 (7 pp.).
WO Reply, EP 17204209.5, dated Mar. 14, 2019 (15 pp.).

*Primary Examiner* — Arun Goyal
(74) *Attorney, Agent, or Firm* — Eversheds Sutherland (US) LLP (57) ABSTRACT

This disclosure relates to systems and methods for tuning combustion dynamics in a combustor. In one embodiment of the disclosure, a method includes providing, via at least one sensor, combustion dynamics amplitude data associated with a combustor. Method may allow monitoring, by an equipment controller communicatively coupled to the at least one sensor, the combustion dynamics amplitude data. The method may allow detecting at least one change in acoustic pressure amplitude associated with combustion in the combustor. In response to detecting the change in the acoustic pressure amplitude, the method proceeds with determining a fuel split change to at least two fuel circuits configured to supply fuel to the combustor, and applying the fuel split change to the combustor.

13 Claims, 10 Drawing Sheets

(51) Int. Cl.
  *F02C 9/26* (2006.01)
  *F02C 9/28* (2006.01)

(56) References Cited

U.S. PATENT DOCUMENTS

| | | | |
|---|---|---|---|
| 8,474,268 B2 * | 7/2013 | Fuller | F02C 9/28 60/773 |
| 9,014,945 B2 | 4/2015 | Abrol et al. | |
| 9,267,443 B2 | 2/2016 | Chandler | |
| 9,328,670 B2 | 5/2016 | Chandler | |
| 9,354,618 B2 | 5/2016 | Chandler | |
| 9,376,963 B2 | 6/2016 | Soni et al. | |
| 9,927,818 B2 * | 3/2018 | Rizkalla | F02C 7/228 |
| 2011/0265487 A1 | 11/2011 | Gauthier et al. | |
| 2014/0182297 A1 | 7/2014 | Terry et al. | |
| 2014/0196461 A1 | 7/2014 | Soni et al. | |
| 2014/0200721 A1 | 7/2014 | Rizkalla et al. | |
| 2014/0260177 A1 | 9/2014 | Reed | |
| 2014/0277790 A1 | 9/2014 | Gauthier et al. | |
| 2015/0142188 A1 | 5/2015 | Terry et al. | |
| 2015/0316266 A1 | 11/2015 | Prade et al. | |
| 2016/0326967 A1 * | 11/2016 | Yamamoto | F02C 9/28 |

FOREIGN PATENT DOCUMENTS

| | | |
|---|---|---|
| EP | 2853720 A2 | 4/2015 |
| EP | 2853720 A3 | 4/2015 |
| FR | 3025590 A1 | 3/2016 |
| JP | 2014015932 A | 1/2014 |
| WO | 2013126279 A1 | 8/2013 |
| WO | 2014137505 A1 | 9/2014 |
| WO | 2015058858 A1 | 4/2015 |

* cited by examiner

| Range 1 | Range 2 | Range 3 | Range 4 | Range 5 | Range 6 | Fuel Split Control |
|---|---|---|---|---|---|---|
| Dynamics Levels | | | | | | Split Change |
| Low Amplitude Level, allows increased split | | | | | | Increase |
| Acceptable Amplitude Level, Low | | | | | | 0 |
| Acceptable Amplitude Level, High | | | | | | 0 |
| High Amplitude Level | | | | | | Small Decrease |
| Significantly High Amplitude Level | | | | | | Medium Size Decrease |
| Highest Amplitude Level | | | | | | Large Decrease |

MODEL-LESS COMBUSTION DYNAMICS AUTOTUNE

RELATED APPLICATION

This application claims priority to India Patent Application Serial No. 201641040986, titled "Model-Less Combustion Dynamics Autotune", filed on Nov. 30, 2016, the contents of which are hereby incorporated by reference.

TECHNICAL FIELD

This disclosure relates to turbomachines, and, more particularly, to systems and methods for tuning combustion dynamics in combustion systems.

BACKGROUND

Combustion dynamics amplitude protection is needed in gas turbine operations. When a relatively high level of a pressure amplitude exists inside a combustor, damage may result to the combustor and/or damage may result to parts of a machine (for example a gas turbine) on which the combustor is installed. High amplitude of the combustion dynamics may cause a relatively high vibration resulting in damage or a complete shutdown of the combustor and the machine. For example, high amplitude of the combustion dynamics can result in an unsteady flame that, in turn, can lead to a flame blow out and cause a shutdown of the machine.

Most conventional combustion systems do not actively control for unexpected high combustion dynamics and/or lack a robust instantaneous combustion dynamics protection. Typical solutions may be limited to monitoring, changing load, and shutting the machine down if unacceptable combustion dynamics are observed. During a field commissioning, the controls are tuned to avoid relatively high combustion dynamics, however, not all conditions can be tested during a short commissioning process. Ambient conditions, fuel variations, and other items are usually not monitored or tested during a typical commissioning process.

SUMMARY OF THE DISCLOSURE

This disclosure relates to systems and methods for tuning combustion dynamics in combustion systems. Certain embodiments of the disclosure can facilitate detecting a change in combustion dynamics amplitude of a combustor and determine a split change for the fuel circuits of the combustor to adjust the combustion dynamics amplitude level.

According to one embodiment of the disclosure, a system for tuning of combustion dynamics is provided. A system may include a combustor and at least two fuel circuits configured to supply fuel to the combustor. The system may also include at least one sensor to detect and provide combustion dynamics amplitude data associated with the combustor. The system may further include an equipment controller communicatively coupled to the at least one sensor. The equipment controller may be configured to analyze the combustion dynamics amplitude data to detect at least one change in acoustic pressure amplitude associated with combustion in the combustor. In response to the change in acoustic pressure amplitude, the equipment controller may determine a fuel split change, wherein fuel split change is a change of the ratio of flow to the two fuel circuits. The equipment controller may further apply the fuel split change to the combustor.

In some embodiments of the disclosure, detection of the change in the acoustic pressure amplitude includes determining that the acoustic pressure amplitude exceeds a predefined dynamics amplitude threshold level for at least one vibrational frequency band of a set of ranges of frequencies.

In certain embodiments of the disclosure, the fuel split change is determined based on a predefined split change direction and an amplitude variation from a default amplitude associated with the at least one vibrational frequency band. In some embodiments of the disclosure, the split change direction is determined based on a minimum of predefined splits changes associated with the set of ranges of frequencies. The set of the ranges may include a range of frequencies from a relatively low range of frequencies to a relatively high range of frequencies. The predefined dynamics amplitude threshold level can be based on at least one of the following: a type of the combustor, acoustics inside the combustor, and a geometrical shape of the combustor.

In some embodiments of the disclosure, the system further comprises at least one sensor to detect and provide an emissions level associated with the combustor. The at least one sensor can be coupled to the equipment controller. The equipment controller can be further configured to determine that the emissions level exceeds a predefined emissions threshold. Based on determining that the emissions level exceeds the predefined emission threshold, the equipment controller can adjust control parameters of the combustor to correct the emissions level.

In some embodiments, the fuel split change is applied incrementally for a period of time until the at least one change in acoustic pressure amplitude in the combustor is eliminated. The period of time can be determined based on conditions of a site and needs and variability of a machine, the site and the machine being associated with the combustor. The equipment controller can be further configured to determine that amplitudes of the combustion dynamics are within predefined allowable limits and, based on the determination, increment the fuel split change to reduce a combustion dynamics level. The equipment controller can further provide the incremented fuel split change to an emissions algorithm configured to control emissions of the combustor and allow the emission algorithm to maintain the emissions within acceptable emissions limits.

According to one embodiment of the disclosure, a method of tuning of combustion dynamics is provided. The method may include providing, via at least one sensor, combustion dynamics amplitude data associated with a combustor. The method may further allow monitoring, by an equipment controller communicatively coupled to the at least one sensor, the combustion dynamics amplitude data to detect at least one change in an acoustic pressure amplitude associated with combustion inside the combustor. In response to detecting at least one change in the acoustic pressure amplitude, the method can determine, by the equipment controller, a fuel split change, the fuel split change being a change of the ratio of flow to at least two fuel circuits configured to supply fuel to the combustor. The method can further include applying, by the equipment controller, the fuel split change to the combustor.

Other embodiments, systems, methods, features, and aspects will become apparent from the following description taken in conjunction with the following drawings.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the disclosure can include systems and methods for tuning combustion dynamics in combustion systems. The disclosed systems and methods can take into considerations ambient conditions, fuel variations, and/or age of the combustion system. The technology described herein can be utilized within new or existing control architectures to alleviate instabilities in combustion dynamics.

In some embodiments of the disclosure, the dynamics protection is integrated into the logic of an existing control of combustion systems, therefore, NOx emissions can also be kept within a compliant range. The dynamics protection technology described herein may use measured combustion dynamics to tune the combustion system in order to meet accepted levels of dynamics amplitudes in multiple frequency ranges. The described technology may eliminate the need for a highly specific and accurate model to provide a fast dynamics protection. A method for tuning combustion dynamics described herein can use a rate of change in a fuel circuit split to calculate desired split changes and provide these desired changes to an emissions control logic which can ensure that emission standards are being complied with.

In some example embodiments of the disclosure, an equipment processor can monitor the combustion dynamics amplitude data to detect at least one change in acoustic pressure amplitude associated with combustion dynamics inside the combustor. In response to detecting at least one change in the acoustic pressure amplitude, the equipment controller can determine a fuel split change to at least two fuel circuits configured to supply fuel to the combustor. The equipment controller can apply the fuel split changes to the combustor.

Technical effects of certain embodiments of the disclosure can include eliminating the manual process of retuning the combustor. Certain embodiments of the disclosure can allow more aggressive fuel split scheduling with an active dynamics control inhibiting relatively high dynamics as desired, thereby minimizing or reducing the need to extrapolate for worst case dynamics scenarios. Further technical effects of certain embodiments of the disclosure can allow for automatic combustion dynamics protection. Further technical effects of certain embodiments of the disclosure can result in better part load operations for heat rate and emission compliant turndown. Yet further technical effects of certain embodiments of the disclosure can provide improvement in emission control and allow a reduction in combustion related trips, forced outage time, and unplanned costs.

The following provides a detailed description of various example embodiments related to systems and methods of tuning combustion dynamics in combustion systems.

Figure 1:
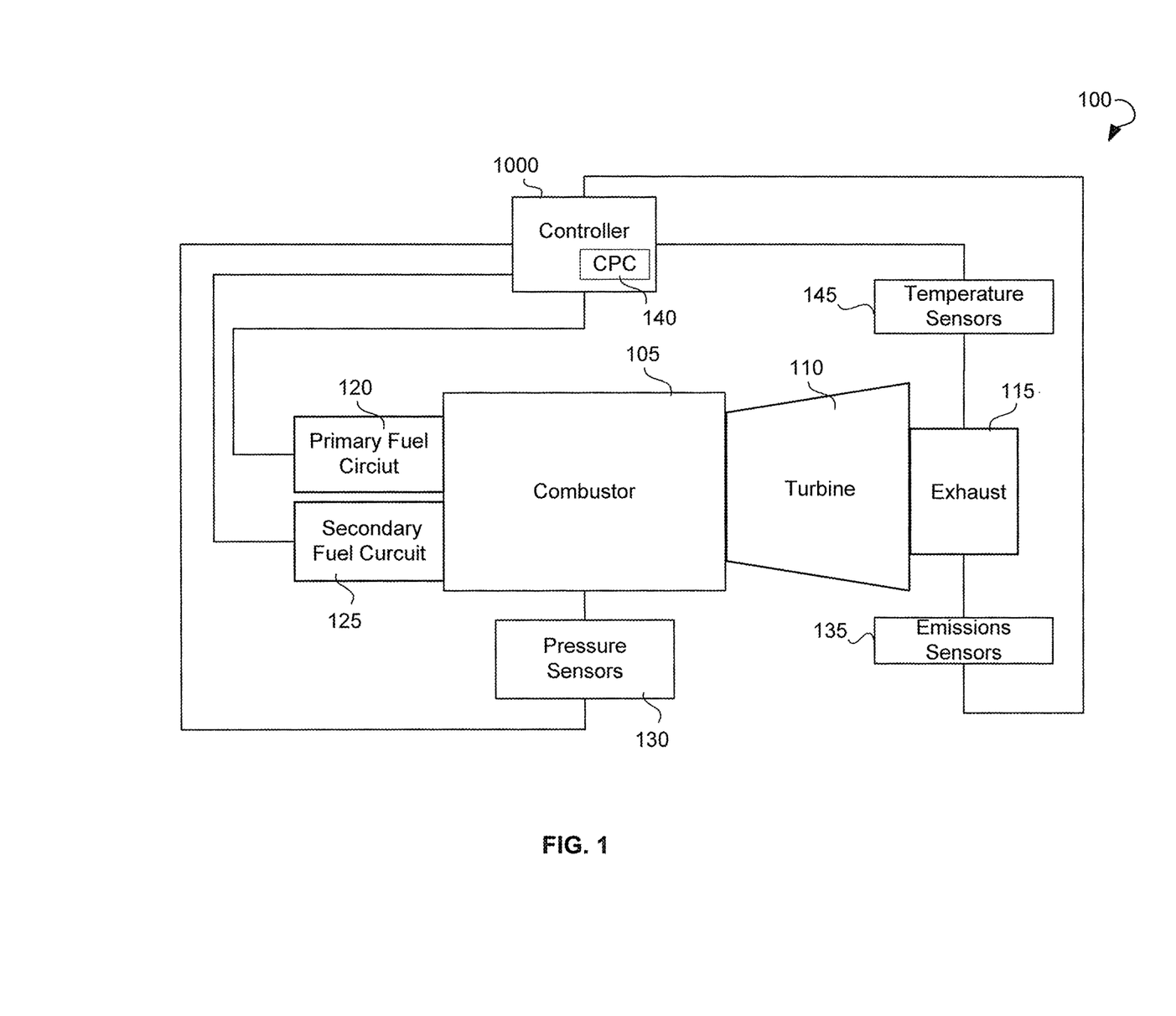
FIG. 1 is a block diagram illustrating an example combustion system, according to some embodiments of the disclosure.

Turning now to the drawings, FIG. 1 is a block diagram illustrating a combustion system 100, in accordance with an example embodiment of the disclosure. The system 100 may include a combustor 105, turbine 110, an exhaust 115, an equipment controller 1000, a primary fuel circuit 120, a secondary fuel circuit 125, pressure sensors 130, nitrogen oxides (NOx) sensors and temperature sensors 135. In some embodiments, one or more types of sensors (pressure, NOx, and temperature) may be combined in a single instrument and/or integrated sensor device. Both the primary fuel circuit 120 and the secondary fuel circuit 125 can be configured to supply fuel the combustor 105 via fuel nozzles disposed inside the combustor 105. The fuel (a liquid fuel or a gaseous fuel) can be mixed with air and combusted in a chamber within the combustor 105, thereby creating hot pressurized exhaust gases. The combustor 105 directs the exhaust gases through a turbine 110 toward an exhaust system 115. Although only one combustor 105 is shown in FIG. 1, in certain embodiments, a plurality of or multiple combustors 105 can be arranged circumferentially about the turbine 110. Each of the plurality of or multiple combustors 105 can be provided fuel via separate fuel circuits and include separate fuel nozzles. In some embodiments of the disclosure, as the exhaust gases pass through the turbine 110, the exhaust gases force turbine blades to rotate a shaft along an axis of the turbine 110. The shaft may be connected to a load. The load may include a vehicle or a stationary load, such as an electrical generator in a power plant, a shaft driven compressor, and the like.

In some embodiments of the disclosure, the equipment controller 1000 can be communicatively connected to the primary fuel circuit 120, the secondary fuel circuit 125, acoustic pressure sensors 130, emissions sensors 135, and temperature sensors 145. The pressure sensors 130 can be configured to detect and provide combustion dynamics data related to the combustor 105. In some embodiments, pressure sensors can include probes located inside the combustor 105. The probes can be configured to perform combustion dynamic monitoring. Specifically, the probes can be configured to convert the combustion dynamic pressure into an electrical signal. The electrical signal, also referred to as a Continuous Dynamics Monitoring (CDM) signal, can be provided to equipment controller 1000 for analysis. The emissions sensors 135 can be configured to sense emissions level of nitrogen oxides and carbon oxides in exhaust gases. The temperature sensors 145 can be configured to sense emission temperature of the exhaust gases. The equipment controller 1000 can be configured to receive the combustion dynamics data, the emissions levels, and the exhaust temperature. The equipment controller 1000 can include a corrected parameter control (CPC) system 140. In some embodiments of the disclosure, the CPC system 140 is configured to analyze the combustion dynamics data, the emissions level, the exhaust temperature, and adjust performance of combustor by controlling fuel flow in the primary fuel circuit 120 and the secondary fuel circuit 125.

Figure 2:
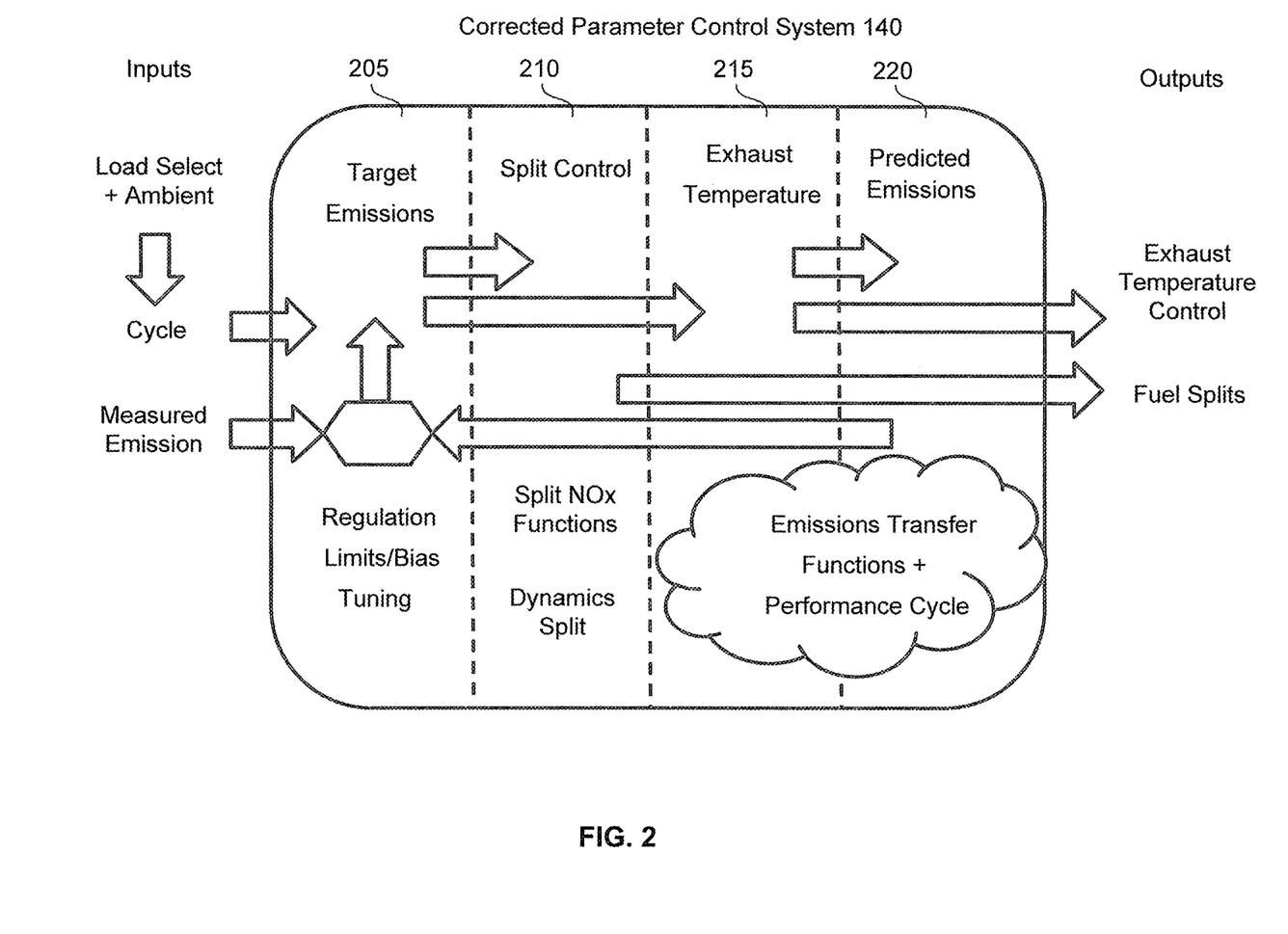
FIG. 2 is a block diagram illustrating an example corrected parameter control (CPC) system, according to an embodiment of the disclosure.

FIG. 2 is a block diagram illustrating an example CPC system 140 broadly, according to an example embodiment of the disclosure. The example CPC system 140 can include target emissions module 205, a split control 210, an exhaust temperature module 215, and a prediction emissions module 220.

In some embodiments of the disclosure, target emissions module 205 is configured to estimate target emissions of a combustion system 100 based on a selection of a load, an ambient condition, a cycle of the turbine 110, and measured emissions of combustion system 100. In some embodiments of the disclosure, the target emission is estimated based on regulation limits and bias tuning of the combustion system 100. The target emissions can be provided to split control 210 and exhaust temperature module 215.

In some embodiments of the disclosure, the split control is configured to provide fuel splits between the primary fuel circuit and the secondary fuel circuit based on the target emissions. In some embodiments of the disclosure, the fuel splits are adjusted based on a dynamics split. In some embodiments, fuel splits are adjusted based on a NOx split and the dynamics split. The NOx split is a function of NOx emission. According to some embodiments of the disclosure, the dynamics split can be a function of combustion dynamics amplitudes of the combustor 105.

In some embodiments of the disclosure, exhaust temperature module 215 is configured to provide an exhaust temperature of combustions system 100. The predicted emission module 220 can be configured to predict emissions of the combustion system 100 based on an exhaust temperature, emission transfer functions and performance cycle analysis. The predicted emissions can be fed back to the target emissions module 205.

Figure 3:
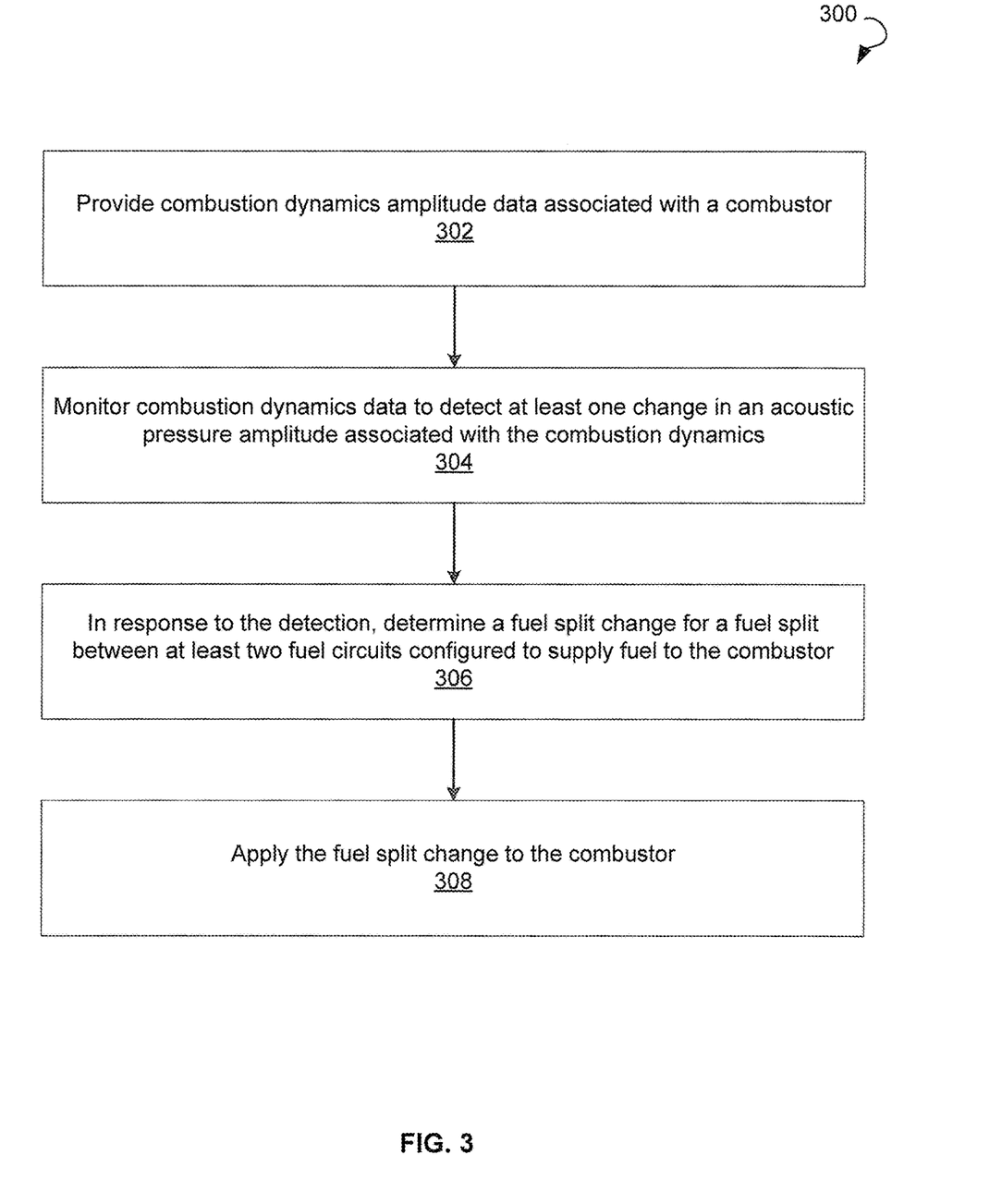
FIG. 3 is a flow chart illustrating an example method for tuning combustion dynamics, according to some embodiments of the disclosure.

FIG. 3 is a flow chart illustrating an example method 300 for automatic tuning of combustion dynamics, according to some embodiments of the disclosure. The operations of the method 300 can be performed by the combustion system 100 described above with reference to FIG. 1.

Method 300 can commence in block 302, with providing, by acoustic pressure sensors 130, the combustion dynamics amplitude data of the combustor 105. In block 304, method 300 can proceed to monitoring, by the equipment controller 1000 (described in more detail below with reference to FIG. 1), the combustion dynamics amplitude data to detect at least one change in acoustic pressure amplitude associated with, combustion dynamics of the combustor 105. The equipment controller 1000 can be communicatively coupled to the acoustic pressure sensor 130 and provide the combustion dynamic amplitude data of the combustor 105.

In block 304, method 300 can proceed, in response to detecting at least one change in acoustic pressure amplitude, with determining, by the equipment controller 1000, a fuel split change. In some embodiments, the fuel split change includes a change in the ratio of flow to the at least two fuel circuits (for example, the primary fuel circuit 120 and the secondary fuel circuit 125) configured to supply fuel to the combustor 105.

In block 306, the method 400 can include applying, by the equipment controller 1000, the fuel split change to the combustor.

Figure 4:
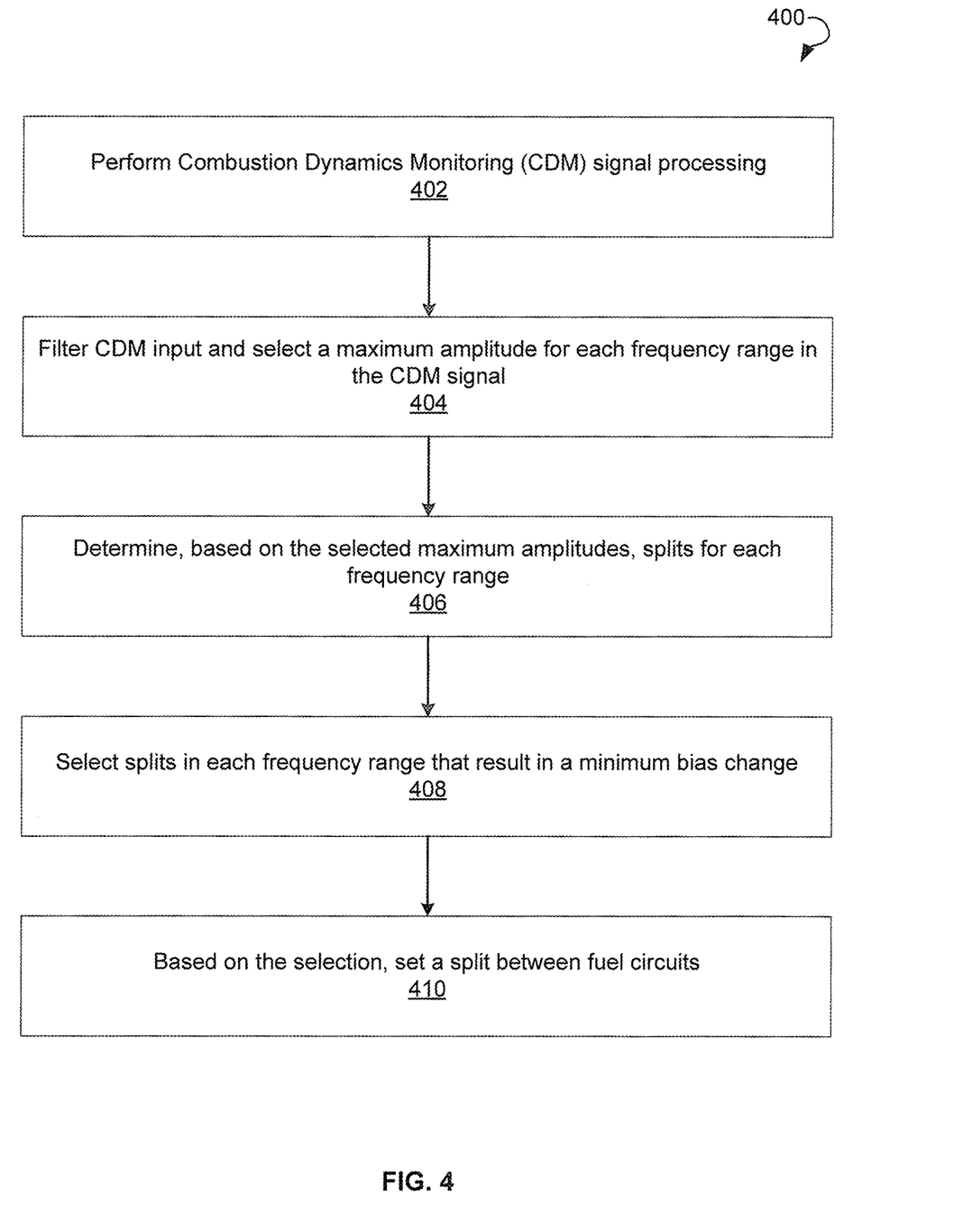
FIG. 4 is a flow chart illustrating an example method for tuning combustion dynamics, according to an embodiment of the disclosure.

FIG. 4 is a flow chart illustrating an example method 400 for tuning of combustion dynamics, according to an embodiment of the disclosure. The operations of the method 1000 may be performed by the combustion system 100 described above with reference to FIG. 1. In block 402, method 400 can commence with performing CDM signal processing to obtain CDM input. In block 404, method 400 can proceed with filtering the CDM input and selecting maximum amplitude for each frequency range in the CDM signal. In certain embodiments, the maximum amplitude can be determined for several ranges of frequencies In block 406, the method 400 can proceed with determining, based on selected maximum amplitudes, splits for each frequency range. According to some embodiments of the disclosure, a broadband spectrum of CDM signal can be divided into several ranges of vibrational frequencies, as illustrated by Table 500 in FIG. 5. Dynamics levels 505 can be pre-determined within each of the vibrational frequencies ranges. The maximum amplitude can be compared to the dynamics levels 505 to determine a direction (increase or decrease) and a value of split change 510 that should be used when the maximum amplitude reaches a certain dynamics level. Number and intervals of the vibrational frequencies ranges, the dynamics levels 505 and values of split change 510 corresponding to specific dynamics level, and a vibrational frequency range can be selected based on specifics of combustions system 100, conditions of the site and a machine on which the combustion system 100 is installed. According to some embodiments, dynamics levels 505 can include a low amplitude level (different for each frequency range) within which the split can be allowed to be increased. Increasing the split may result in improving emissions of the combustor.

Figure 5:
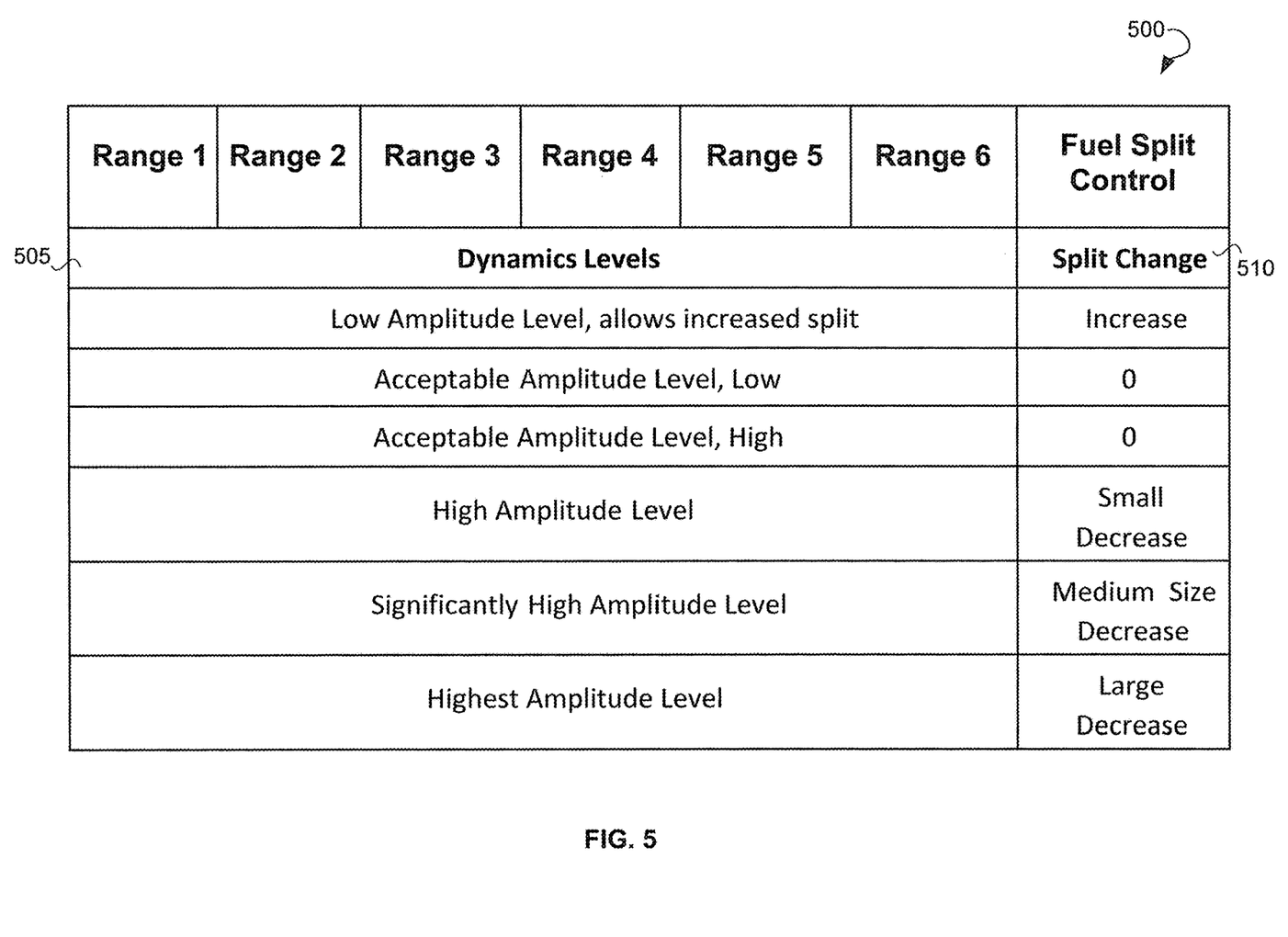
FIG. 5 is a block diagram showing a table for selection of fuel split changes based on dynamics amplitude levels, according to an example embodiment.

The dynamics levels may include an acceptable low amplitude level and an acceptable high amplitude level within which no change in split is required. The dynamics levels 505 can include a relatively high amplitude level. If the maximum amplitude reaches the high amplitude level, the change in the split includes a small decrease. The dynamics levels 505 can include a significantly high amplitude level. If the maximum amplitude reaches the significantly high amplitude level, it can result in a medium size decrease in the split change. The dynamics levels 505 can also include the highest amplitude level. If the maximum amplitude reaches the highest amplitude level, then a medium size decrease could be needed for the split change.

Referring back to FIG. 4, in block 408, the method 400 can select splits in each frequency range that result in a minimum split bias change. In block 410, the method 400 may set, based on the selection, a split between fuel circuits of combustion system 100. It should be noted that when a split decrease can result in dropping a fuel flow in the primary fuel circuit 120 and increasing a fuel flow in the secondary fuel circuit 125. As a result, the flame inside the combustor can be stabilized. Stability of the flames can drive the dynamics amplitude to a lower value. However, when the flame stabilizes, emission values of the combustor can deteriorate. In some embodiments of the disclosure, the combustion temperature is reduced to maintain emissions in conjunction with split change through tuning of combustion dynamics. In some embodiments of the disclosure, when dynamics amplitudes return to acceptable amplitude levels, the fuel split may be allowed to increase in order to improve emission values of the combustor 105.

Figure 6:
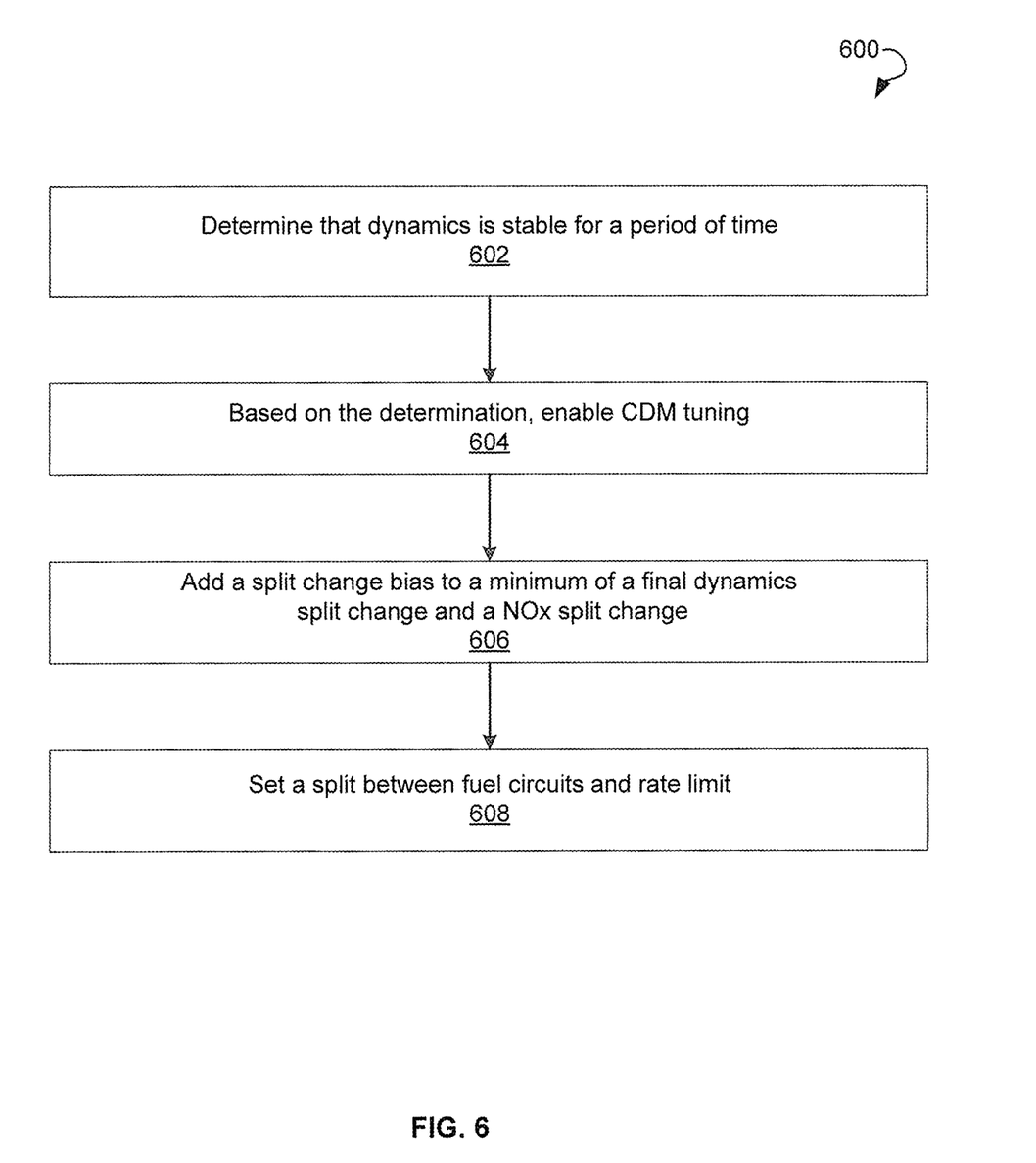
FIG. 6 is a flow chart illustrating an example method for tuning combustion dynamics, according to another embodiment of the disclosure.

FIG. 6 is a flow chart illustrating an example method 600 for tuning of combustion dynamics, according to another embodiment of the disclosure. The operations of the method 600 may be performed by the combustion system 100. The method 600 may commence, in block 602, with determining that combustion dynamics are stable for a period of time. This period of time can depend on site conditions and specific needs of the machine on which the combustion system 100 is installed.

In block 604, the method 600 can proceed with enabling, based on the determination that combustion dynamics are relatively stable, a CDM tuning. In block 606, the method 600 can add a split change bias to a minimum of a final dynamics split change and a NOx split change. The split change bias can be determined by the method 400 as described with reference to FIG. 4 above. The NOx split change is one of several control parameters of CPC system 140, which determines a base load selection, a turbine cycle, a measured emissions level, and a target emissions level.

In block 608, the method 600 may proceed with setting a split between fuel circuits and rate limits. In some embodiments of the disclosure, operations of blocks 602-604 can be repeated recursively until dynamics amplitudes of the combustor 105 are within acceptable amplitude levels for all vibrational frequency ranges.

Figure 7:
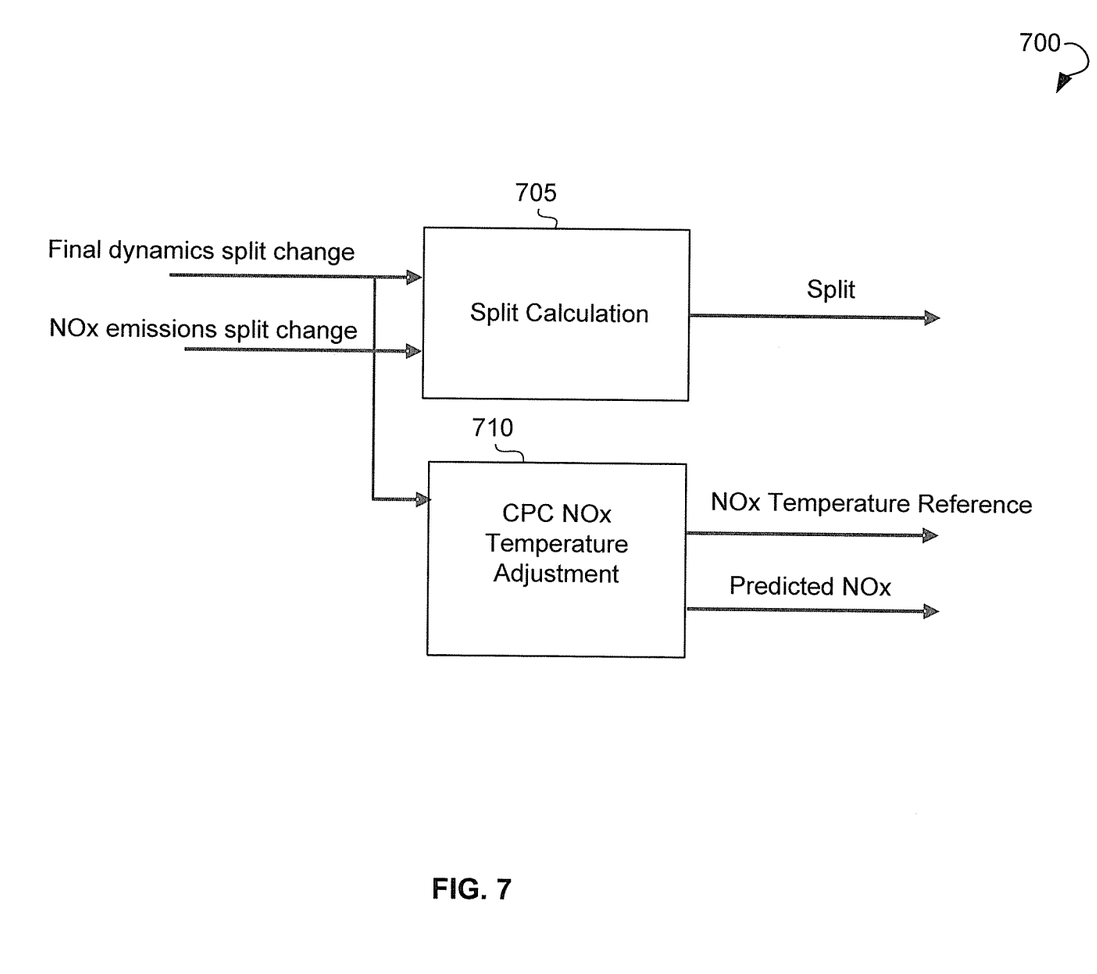
FIG. 7 is a block diagram showing logic for calculation of a fuel split, according to some example embodiments of the disclosure.

FIG. 7 is a block diagram showing logic 700 for calculation of fuel split, according to some example embodiments of the disclosure. The logic 700 can be incorporated in CPC system 140. The logic 700 can include a split calculation module 705 and NOx temperature adjustment module 710.

In some embodiments of the disclosure, the split calculation module 705 is configured to determine a (fuel) split between fuel circuits. The fuel circuits can include the primary fuel circuit 120 and the secondary fuel circuit supplying fuel to the combustor 105. In some embodiments of the disclosure, the split can be determined based only on the final dynamics split change. The final dynamic split can be adjusted based on a split bias determined based on changes in the combustion dynamics amplitude. In other embodiments of the disclosure, the split can be determined based on both final dynamics split and NOx emissions split change. The NOx emission split change can be determined using an emission control loop by CPC system 140.

In yet another embodiment of the disclosure, final dynamics split change can be provided as a parameter to NOx temperature adjustment module 710. The module 710 can be configured to determine NOx temperature reference and a predicted NOx emission level. The CPC system 140 can use the NOx temperature reference and the predicted NOx emission level to adjust control parameters of combustion system 100.

Figure 8:
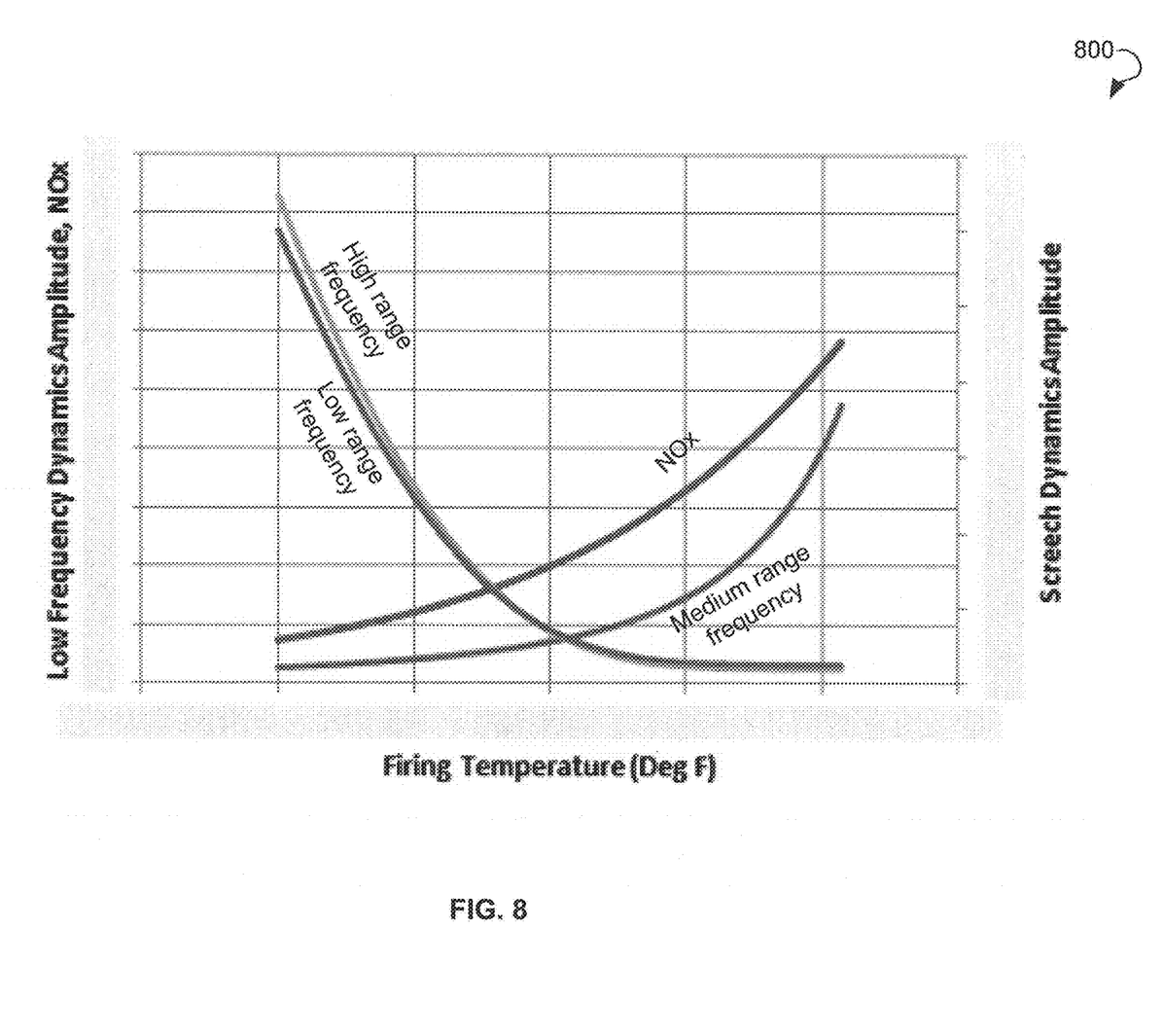
FIG. 8 is an example plot of combustion pressure amplitudes at several frequency ranges and NOx emissions as functions of fire temperature of combustor.

FIG. 8 is an example plot 800 of combustion pressure amplitudes at several frequency ranges and NOx emissions as functions of the combustion temperature, in accordance with an embodiment of the disclosure. The combustion temperature can be controlled by setting a total fuel flow to the combustor. Dynamics amplitude at about 50 Hertz is a function of a relatively weak secondary flame, a low firing temperature, a low NOx emission, and a low secondary/high primary split. Dynamics amplitude at about 70 Hertz is a function of a relatively high primary split (with flame anchoring primarily on gas fuel), high firing temperature, and high NOx emissions. Dynamics amplitude at about 2400 Hertz is a function of relatively low secondary/high primary split, low firing temperature, and low firing frequency. Data concerning dependencies of dynamics amplitude from other combustion parameters can be used to determine selection of splits for each frequency region.

Figure 9:
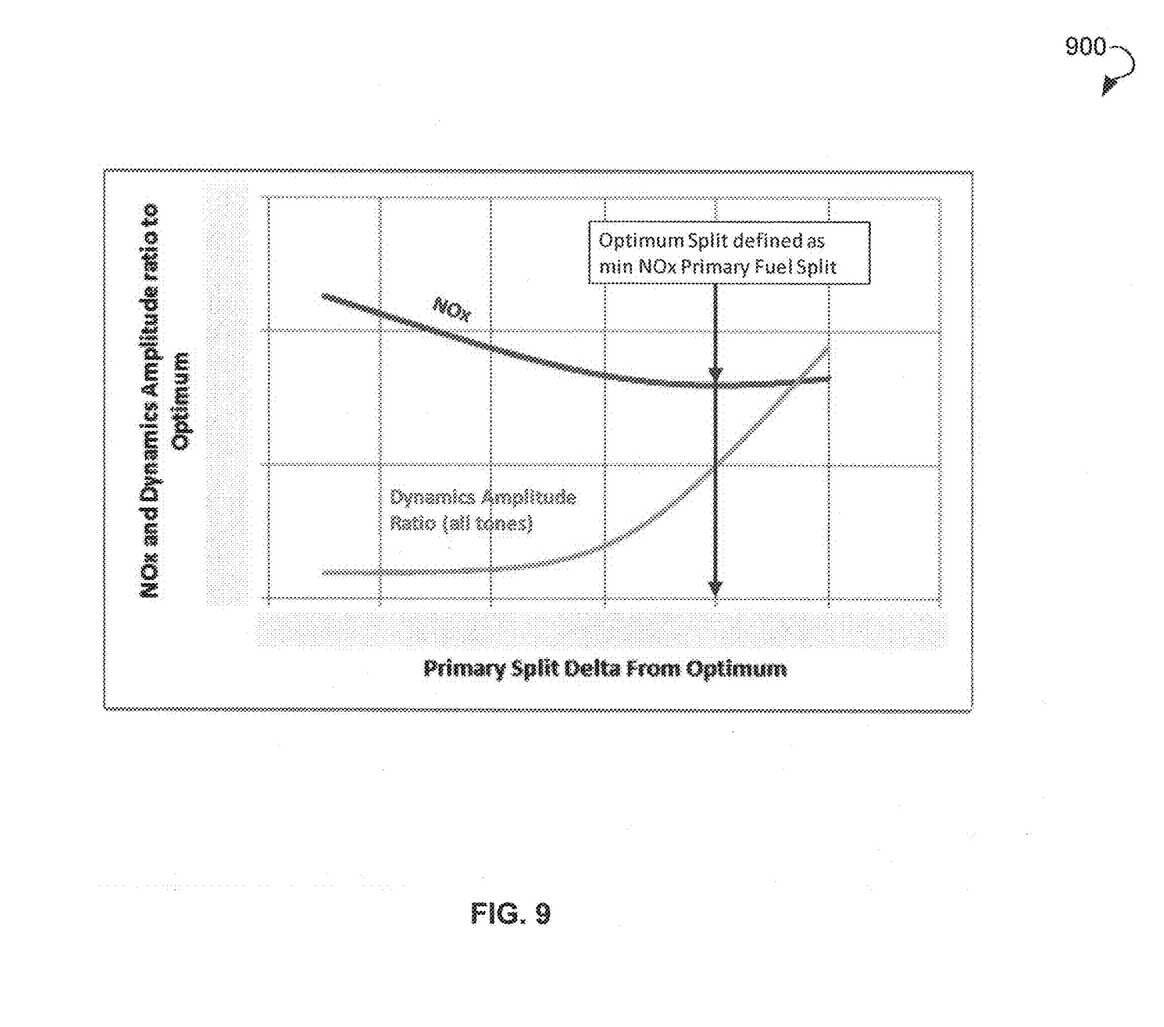
FIG. 9 is an example plot of a ratio of NOx emissions and dynamics amplitude to dynamics amplitude with optimal primary split as a function of differences between a primary split and optimal primary split.

FIG. 9 is an example plot 900 of NOx emissions and dynamics amplitude ratio to an optimal split as functions of a difference between a primary split and an optimal split, in accordance with an embodiment of the disclosure. The optimal split can be defined as a primary fuel split at which NOx emission reaches its minimum. As seen in the plot 900, dynamic amplitude can be lowered by decreasing a primary split, but decreasing of the primary fuel split can result in increasing of a NOx emission.

Figure 10:
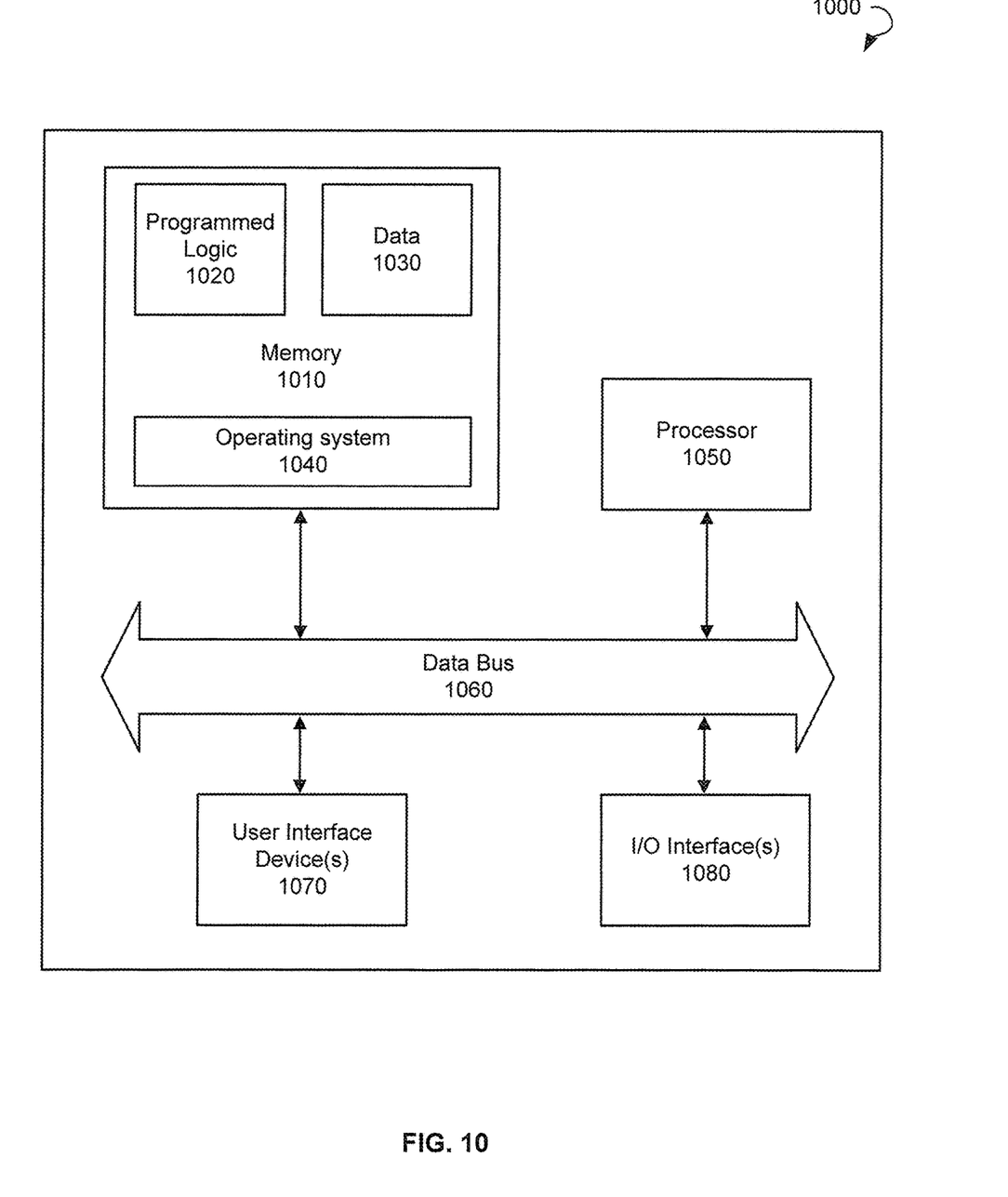
FIG. 10 is a block diagram illustrating an example controller for controlling operation of a combustor, in accordance with an embodiment of the disclosure.

FIG. 10 depicts a block diagram illustrating an example controller 1000, in accordance with an embodiment of the disclosure. More specifically, the elements of the controller 1000 may be used to run combustion system 100 under a plurality of operational conditions while within predetermined combustion operational boundaries, automatically collect operational data associated with the combustion system 100 while the combustion system 100 is running, store the operational data, generate a set of constants for one or more predetermined combustion transfer functions based on the operational data, and store the set of constants in the CPC system 140 to be used during the commissioning of the combustion fuel system. The controller 1000 may include a memory 1010 that stores programmed logic 1020 (e.g., software) and may store data 1030, such as operational data associated with the combustion fuel system, the set of constants, and the like. The memory 1010 also may include an operating system 1040.

A processor 1050 may utilize the operating system 1040 to execute the programmed logic 1020, and in doing so, may also utilize the data 1030. A data bus 1060 may provide communication between the memory 1010 and the processor 1050. Users may interface with the controller 1000 via at least one user interface device 1070, such as a keyboard, mouse, control panel, or any other device capable of communicating data to and from the controller 1000. The controller 1000 may be in communication with the combustion system 100 while operating, as well as in communication with the CPC system 140 offline while not operating, via an input/output (I/O) interface 1080. Additionally, it should be appreciated that other external devices or multiple other combustion systems or combustors may be in communication with the controller 1000 via the I/O interface 1080. In the illustrated embodiment of the disclosure, the controller 1000 may be located remotely with respect to the turbine system; however, it may be co-located or even integrated with the combustion system 100. Further, the controller 1000 and the programmed logic 1020 implemented thereby may include software, hardware, firmware, or any combination thereof. It should also be appreciated that multiple controllers 1000 may be used, whereby different features described herein may be executed on one or more different controllers 400.

References are made to block diagrams of systems, methods, apparatuses, and computer program products, according to example embodiments of the disclosure. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for tuning of combustion dynamics, the system comprising:
   a combustor;
   a primary fuel circuit in communication with the combustor;
   a secondary fuel circuit in communication with the combustor;
   at least one combustion dynamics amplitude data sensor associated with the combustor configured to convert combustion dynamics amplitude data into at least one electrical signal;
   at least one nitrogen oxide emission sensor associated with the combustor;
   a split control; and
   an equipment controller communicatively coupled to the at least one combustion dynamics amplitude data sensor and the at least one nitrogen oxide emission sensor,
   wherein the equipment controller is configured to:
      determine target nitrogen oxide emissions via a target emissions module, wherein the target nitrogen oxide emissions is based at least in part on a load, a measured nitrogen oxide emission via the at least one nitrogen oxide emission sensor, and a cycle of a turbine in communication with the combustor;
      receive the at least one electrical signal from the at least one combustion dynamics amplitude data sensor;
      analyze an exhaust temperature of the combustor;
      analyze the measured nitrogen oxide emission associated with combustion in the combustor;
      analyze predicted nitrogen oxide emissions via a predicted emissions module, wherein the predicted emissions module is configured to predict the predicted nitrogen oxide emissions based at least in part on the exhaust temperature;
      analyze the at least one electrical signal to detect at least one change in an acoustic pressure amplitude associated with combustion in the combustor, wherein detection of the at least one change in the acoustic pressure amplitude includes:
         dividing the at least one electrical signal into a set of several ranges of frequencies,
         determining predefined dynamics amplitude threshold levels within each frequency ranges in the set of several ranges of frequencies, wherein the predefined dynamics amplitude threshold levels include a low amplitude level, a lower acceptable amplitude level, a higher acceptable amplitude level, a high amplitude level, a significantly high amplitude level, and a highest amplitude level, and
         determining that the acoustic pressure amplitude exceeds a predefined dynamics amplitude threshold levels for at least one vibrational frequency band within each of the frequency ranges in the set of several ranges of frequencies;
      select predefined splits based on each of the predefined dynamics amplitude threshold levels in each of the frequency ranges in the set of several ranges of frequencies, wherein the predefined splits include a direction and a value of split change that should be used when the acoustic pressure amplitude reaches one of the predefined dynamics amplitude threshold levels: a predefined increase at the low amplitude level, no split change at the lower acceptable amplitude level, no split change at the higher acceptable amplitude level, a small predefined decrease at the high amplitude level, a medium predefined decrease at the significantly high amplitude level, and a large predefined decrease at the highest amplitude level;
      determine a fuel split change in response to the at least one change in the acoustic pressure amplitude, the predicted nitrogen oxide emissions, and the target nitrogen oxide emission, the fuel split change being a change of the ratio of flow between the primary fuel circuit and the secondary fuel circuit, wherein determining the fuel split change is based on one of the predefined splits; and apply the fuel split change to the split control, and wherein the split control is configured to provide the fuel split change between the primary fuel circuit and the secondary fuel circuit.

2. The system of claim 1, wherein the set of several ranges of frequencies includes a range of frequencies from a low range of frequencies to a high range of frequencies.

3. The system of claim 1, wherein the predefined dynamics amplitude threshold levels are based on at least one of the following: a type of the combustor, acoustics inside the combustor, and a geometrical shape of the combustor.

4. The system of claim 1, wherein the at least one nitrogen oxide emission sensor is coupled to the equipment controller, and wherein the equipment controller is further configured to:

determine that the measured nitrogen oxide emission exceeds a predefined emissions threshold; and based on determining the measured nitrogen oxide emission exceeds the predefined emissions threshold, adjust control parameters of the combustor to correct the measured nitrogen oxide emission.

5. The system of claim 1, wherein the fuel split change is provided by the split control incrementally for a period of time until the at least one change in the acoustic pressure amplitude in the combustor is eliminated.

6. The system of claim 5, wherein the equipment controller is further configured to:

determine that the combustion dynamics amplitude are within predefined allowable limits;

in response to determining:

increment the fuel split change to reduce the combustion dynamics amplitude level;

provide the fuel split change to an emissions algorithm configured to control the measured nitrogen oxide emission of the combustor to allow the emission algorithm maintain the measured nitrogen oxide emission within acceptable emissions limits.

7. The system of claim 5, wherein the period is determined based on conditions of a site and needs and variability of a machine, the site and the machine being associated with the combustor.

8. A method for tuning of combustion dynamics in a combustor, the method comprising:

providing, via at least one combustion dynamics amplitude data sensor, combustion dynamics amplitude data associated with the combustor in a form of at least one electrical signal;

providing, via at least one nitrogen oxide emission sensor, nitrogen oxide emission data associated with the combustor;

determining predicted nitrogen oxide emissions via a predicted emissions module, wherein the predicted emissions module is configured to predict the predicted nitrogen oxide emissions based at least in part on exhaust temperature;

determining target emissions via a target emissions module, wherein the target emissions is based at least in part on a load, a measured emission via the at least one nitrogen oxide emission sensor, and a cycle of a turbine in communication with the combustor;

monitoring, by an equipment controller communicatively coupled to the at least one combustion dynamics amplitude data sensor, the at least one electrical signal to detect at least one change in an acoustic pressure amplitude associated with combustion in the combustor, wherein detection of the at least one change in the acoustic pressure amplitude includes:

dividing the at least one electrical signal into a set of several ranges of frequencies, determining predefined dynamics amplitude threshold levels within each frequency ranges in the set of several ranges of frequencies, wherein the predefined dynamics amplitude threshold levels include a low amplitude level, a lower acceptable amplitude level, a higher acceptable amplitude level, a high amplitude level, a significantly high amplitude level, and a highest amplitude level, and determining that the acoustic pressure amplitude exceeds a predefined dynamics amplitude threshold levels for at least one vibrational frequency band within each of the frequency ranges in the set of several ranges of frequencies;

selecting predefined splits based on each of the predefined dynamics amplitude threshold levels in each of the frequency ranges in the set of several ranges of frequencies, wherein the predefined splits include a direction and a value of split change that should be used when the acoustic pressure amplitude reaches one of the predefined dynamics amplitude threshold levels: a predefined increase at the low amplitude level, no split change at the lower acceptable amplitude level, no split change at the higher acceptable amplitude level, a small predefined decrease at the high amplitude level, a medium predefined decrease at the significantly high amplitude level, and a large predefined decrease at the highest amplitude level;

determining, in response to detecting at least one change in the acoustic pressure amplitude and receiving the target emissions and the predicted nitrogen oxide emissions, by the equipment controller, a fuel split change, the fuel split change being a change of the ratio of flow to a primary fuel circuit in communication with the combustor and a secondary fuel circuit in communication with the combustor configured to supply fuel to the combustor, wherein determining the fuel split change is based on one of the predefined splits;

applying, by the equipment controller, the fuel split change to a split control; and providing, by the split control, the fuel split change between the primary fuel circuit and the secondary fuel circuit.

9. The method of claim 8, wherein the set of several ranges of frequencies includes a range of frequencies from a low range of frequencies to a high range of frequencies.

10. The method of claim 8, wherein the predefined dynamics amplitude threshold levels are based on at least one of the following: a type of the combustor, acoustics inside the combustor, and a geometrical shape of the combustor.

11. The method of claim 8, further comprising:

providing, via at least one other sensor coupled to the equipment controller, emissions level associated with the combustor;

determine, by the equipment controller, that the emissions level exceeds a predefined emissions threshold; and based on determining, adjust, by the equipment controller, based on the emissions level, the fuel split change.

12. The method of claim 8, wherein the split change is provided by the split control incrementally for a predefined period of time until the at least one change in the acoustic pressure amplitude in the combustor is removed.

13. The method of claim 12, further comprising:
   determining, by the equipment controller, that the combustion dynamics amplitude are within pre-defined allowable limits; and
   in response to determining:
      incrementing, by the equipment controller, the fuel split change to reduce the combustion dynamics amplitude level; and
      providing, by the equipment controller, the fuel split change to an emissions algorithm configured to control the measured emissions of the combustor to allow the emission algorithm maintain the measured emissions within acceptable emissions limits.

* * * * *